Figure 6:
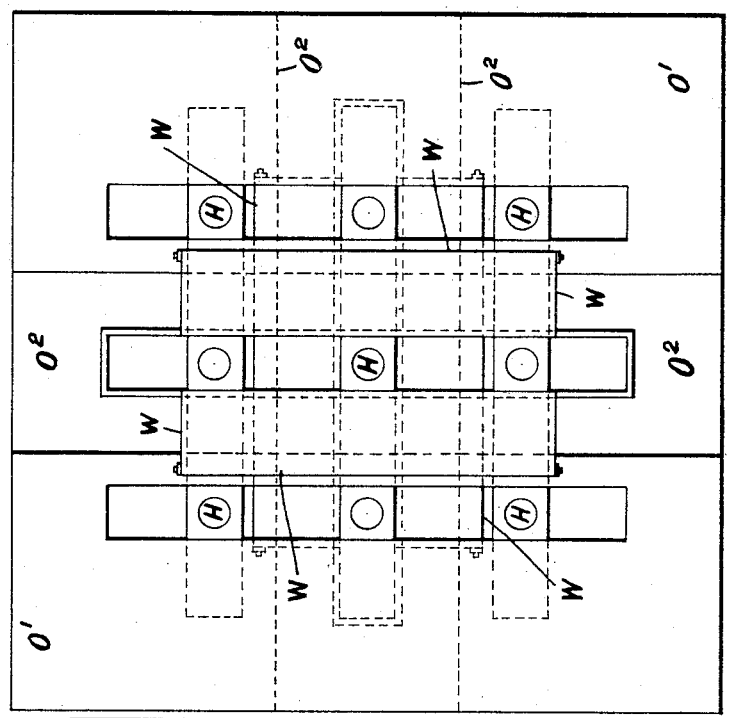

No. 696,877. Patented Apr. 1, 1902.
H. MACKINTOSH.
APPARATUS FOR PRODUCING REPEAT DESIGNS.
(Application filed Sept. 15, 1900.)
(No Model.) 6 Sheets—Sheet 1.
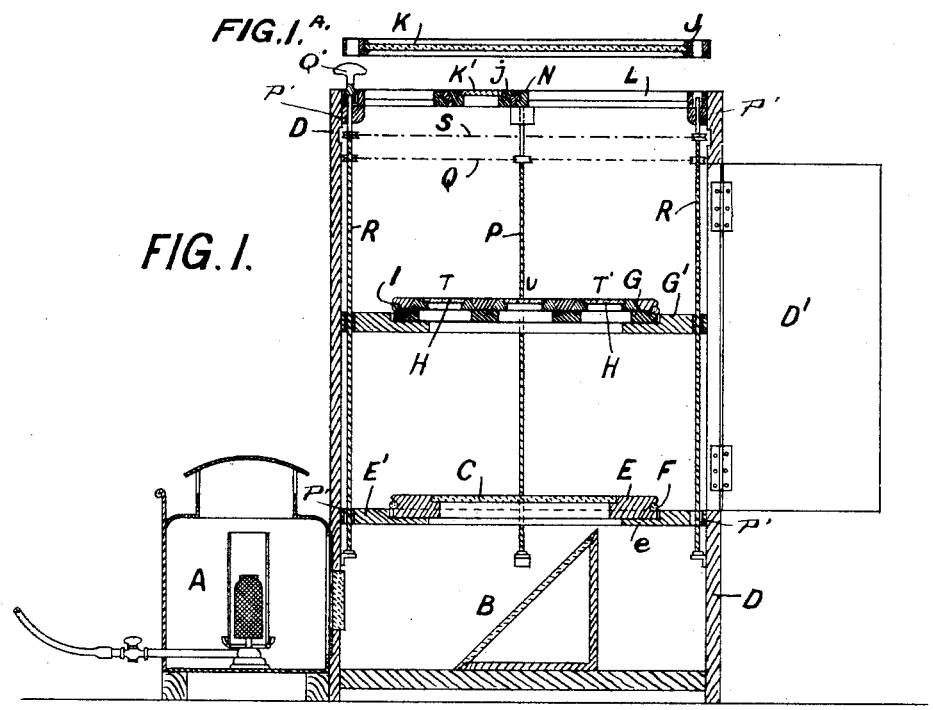
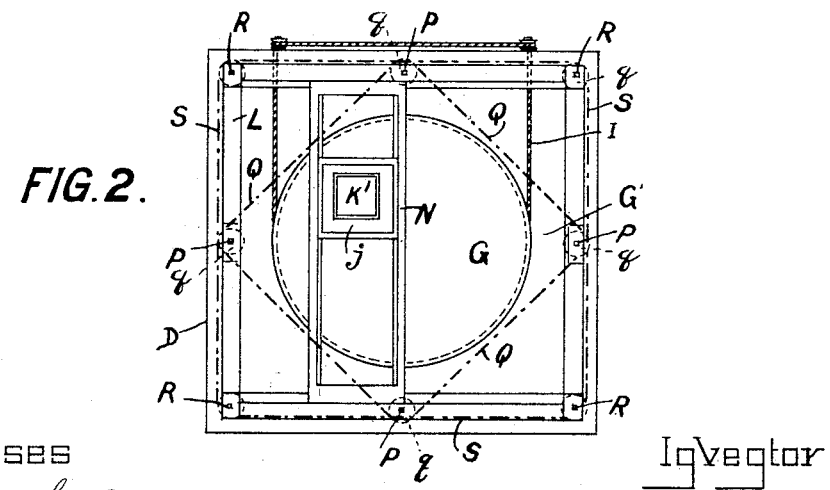
Witnesses
Geo. Kingsbury
H. S. Belt
Inventor
Harry Mackintosh.
by Mason Fenwick Lawrence,
Attys.

No. 696,877. Patented Apr. 1, 1902.
H. MACKINTOSH.
APPARATUS FOR PRODUCING REPEAT DESIGNS.
(Application filed Sept. 15, 1900.)
(No Model.) 6 Sheets—Sheet 2.
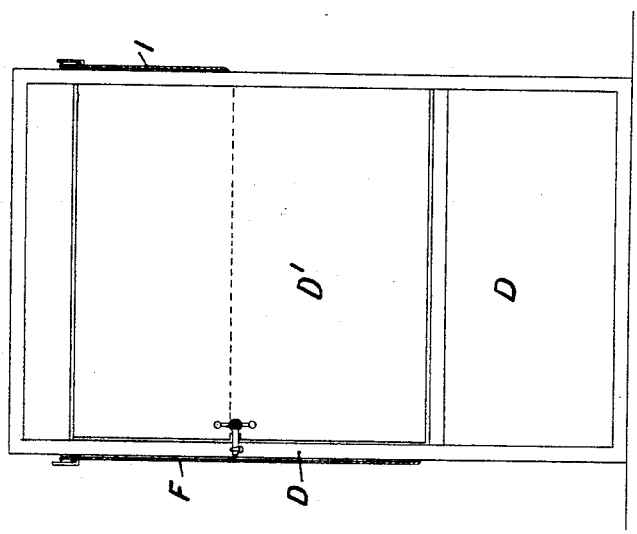
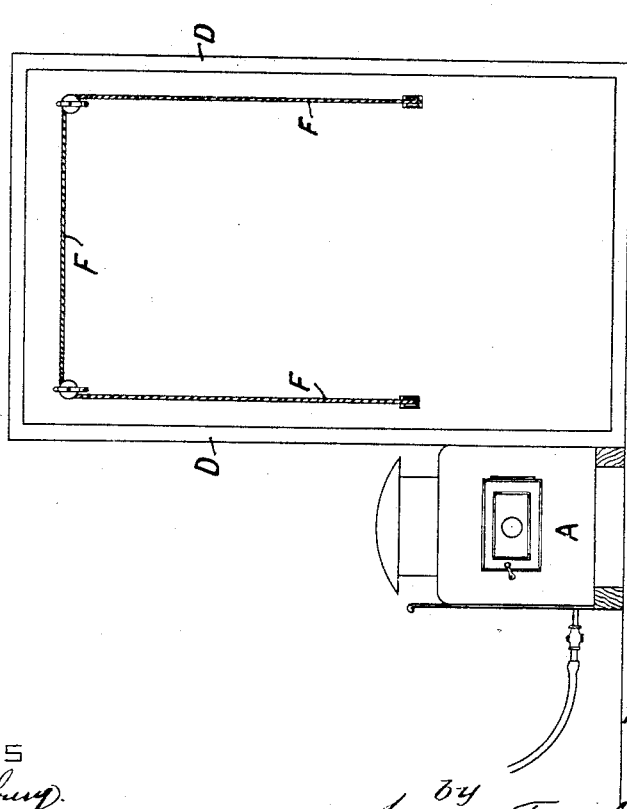

No. 696,877. Patented Apr. 1, 1902.
H. MACKINTOSH.
APPARATUS FOR PRODUCING REPEAT DESIGNS.
(Application filed Sept. 15, 1900.)
(No Model.) 6 Sheets—Sheet 3.

Witnesses
Geo. Kingsbury
F. L. Belt

Inventor
Harry Mackintosh.
by Mason, Fenwick & Lawrence
Attys.

No. 696,877. Patented Apr. 1, 1902.
H. MACKINTOSH.
APPARATUS FOR PRODUCING REPEAT DESIGNS.
(Application filed Sept. 15, 1900.)
(No Model.) 6 Sheets—Sheet 4.

No. 696,877. Patented Apr. 1, 1902.
H. MACKINTOSH.
APPARATUS FOR PRODUCING REPEAT DESIGNS.
(Application filed Sept. 15, 1900.)

(No Model.) 6 Sheets—Sheet 5.

FIG. 12. Harry Mackintosh

Witnesses
Geo. P. Kingsbury
F. S. Belt

Inventor
by
Mason Fenwick Lawrence
Attys.

No. 696,877. Patented Apr. 1, 1902.
H. MACKINTOSH.
APPARATUS FOR PRODUCING REPEAT DESIGNS.
(Application filed Sept. 15, 1900.)
(No Model.) 6 Sheets—Sheet 6.
FIG. 13.
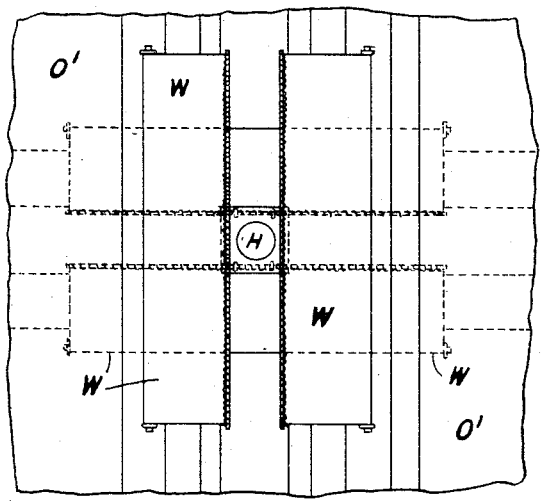
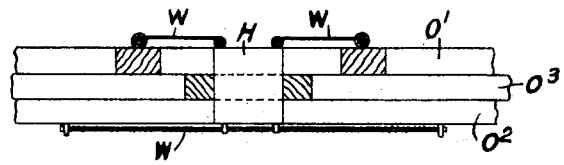
FIG. 14.
Witnesses
Geo. P. Kingsbury
Fenton S. Belt
Inventor
Harry Mackintosh.
by Mason Fenwick & Lawrence,
Attys.

UNITED STATES PATENT OFFICE.

HARRY MACKINTOSH, OF SHIPLEY, ENGLAND.

APPARATUS FOR PRODUCING REPEAT-DESIGNS.

SPECIFICATION forming part of Letters Patent No. 696,877, dated April 1, 1902.

Application filed September 15, 1900. Serial No. 30,193. (No model.)

*To all whom it may concern:*

Be it known that I, HARRY MACKINTOSH, a subject of the Queen of Great Britain, residing at Shipley, in the county of York, England, have invented certain new and useful Improvements in Apparatus for Producing Repeat-Designs, (for which patents have been applied for in Great Britain under No. 4,796, dated March 13, 1900; No. 9,667, dated May 25, 1900, and No. 14,784, dated August 17, 1900,) of which the following is a specification.

This invention has for its object an apparatus whereby repeat-patterns can be originated, modified or corrected, and reproduced. It consists, essentially, in mechanism by which natural or other objects or representations or a combination of such may be reflected upon a plate or other surface by means of any desired number of lenses located in the same plane, so as to give a corresponding number of representations of the object, or group of objects, in such positions as to show what will be the result of their appearance as a repeated pattern in the finished article of commerce or manufacture to which the repeat-pattern may be applied. The lenses may be moved in any way to give variety to the design and to make the numerous repeats correctly register with each other and form a harmonious whole.

In embodying my invention in a practical form I use the apparatus set forth in the accompanying drawings, in which—

Figure 5:
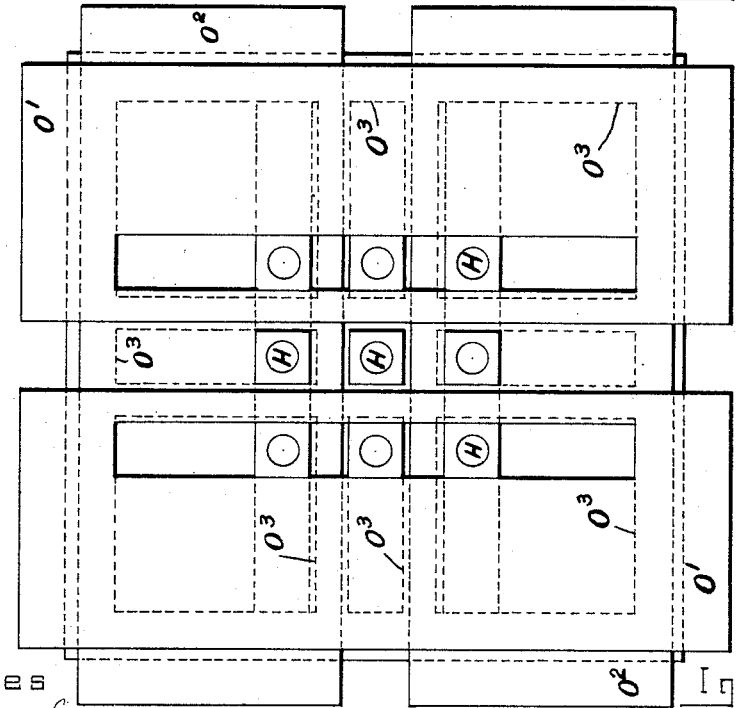
Figure 8:
Figure 7:
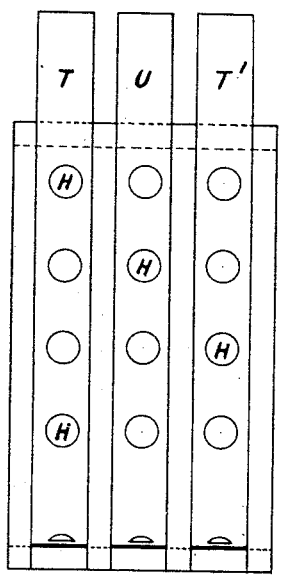
Figure 9:
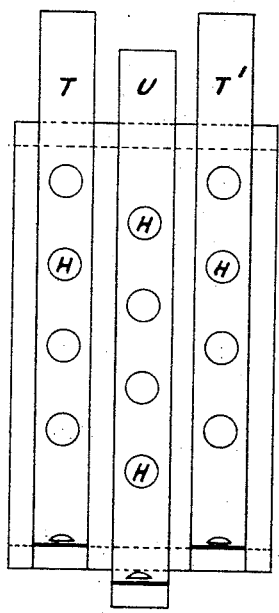
Figure 10:
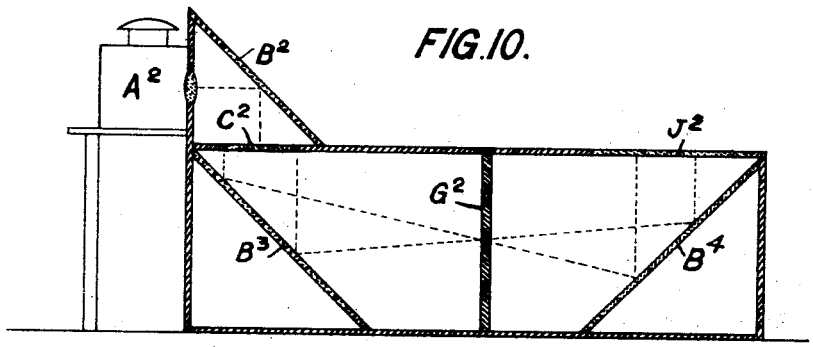
Figure 11:
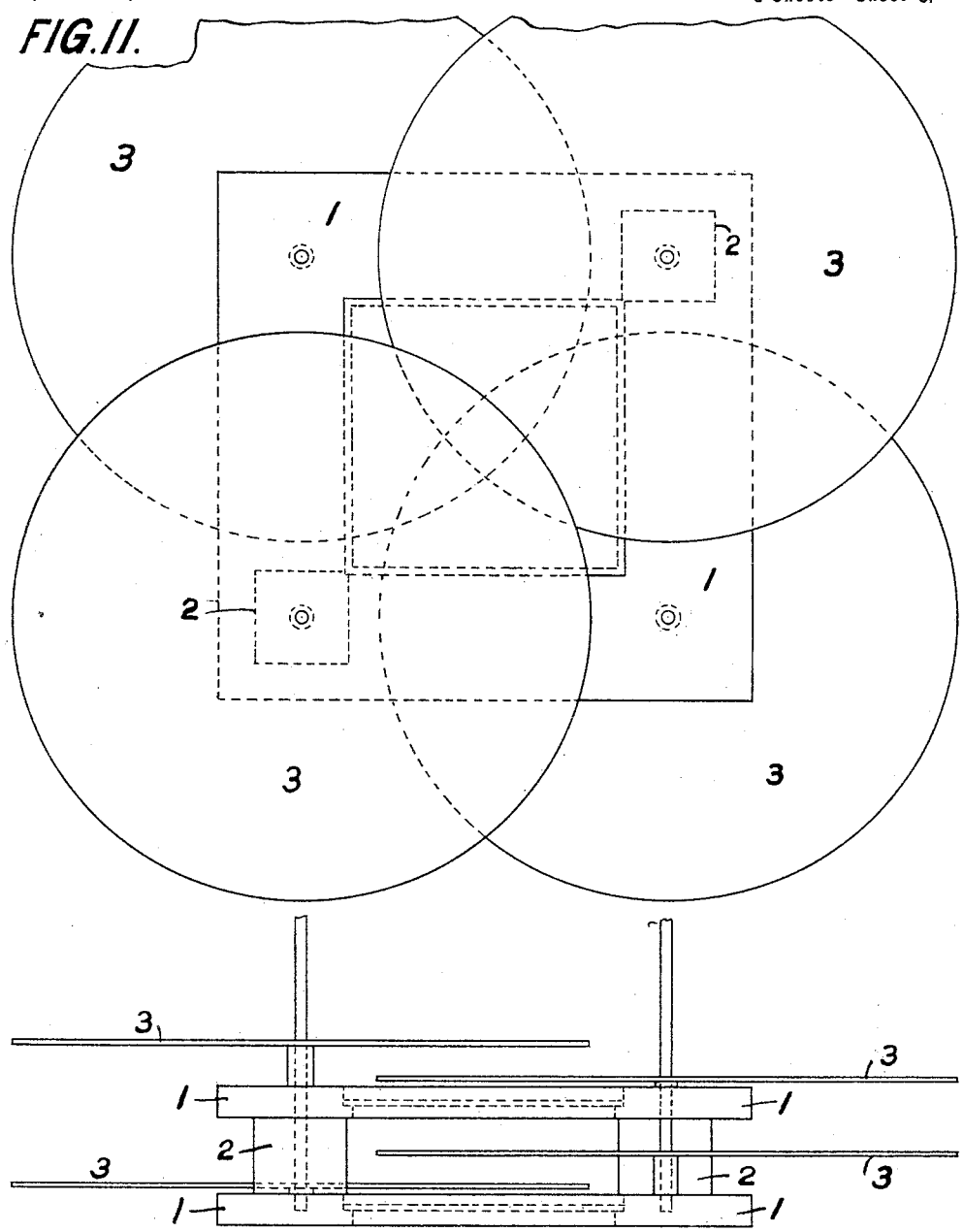

Figure 1 is a sectional elevation of the apparatus, some of the smaller parts, such as lenses, not being depicted. Fig. 1ª is a section of a change-plate adapted to be used instead of the top plate shown in Fig. 1; Fig. 2, a plan view of the construction shown in Fig. 1; Figs. 3 and 4, side and front elevations; Figs. 5 and 6, plans of central portion of the lens plate or wheel in two positions, showing the lenses and operating parts in one case in close order, in the other expanded; Figs. 7 and 8, a plan and a section of a variation of central portion of lens plate and wheel; Fig. 9, a similar view to Fig. 7, but arranged for drop-patterns; Fig. 10, a diagrammatic view showing a modified form of the apparatus. Fig. 11 is a plan view, and Fig. 12 a section, of a variation of the object-plate $C^2$. Fig. 13 is a detail plan view, on an enlarged scale, showing a blind and adjacent parts. Fig. 14 is a detail sectional view through the same.

Referring first to Figs. 1, 2, 3, and 4, A is a lantern or other source of light-rays; B, a mirror set at an angle of forty-five degrees with the axis of the lantern-rays; C, a plate of glass on which any transparent, translucent, or opaque article, object, drawing, or painting is placed; D, a box cupboard or frame carrying the mechanism; D', door of same; E, a wheel mounted on frame $e$ therein carrying plate C and capable of being rotated by cords F and resting on movable frame E'. G is a similar wheel mounted on similar frame G' in box D, carrying a series of lenses H, as hereinafter described. It also is capable of being rotated by cords I. J is a frame (shown out of position) carrying a translucent sheet K', preferably of ground glass, and arranged as a screen. In the drawings instead of the frame J a frame L is shown in position, having a slide N, adapted to slide therein, and a screen $j$, adapted to slide longitudinally in slide N. N and $j$ are used to replace J and permit of the plate being adjusted in both directions.

Referring now to Figs. 5 and 6, which show on a larger scale a plan in two positions of the lenses carried by wheel G and lens-moving devices for ordinary repeats, H H are nine lenses. There can be sixteen or other number, if desired, which are all similar and of equal size and are located in the same plane. They are set in sliding frames O', $O^2$, and $O^3$, which are arranged in different parallel planes, and O' $O^2$ are at right angles to each other, the middle one, $O^3$, only being fixed, but the others free to slide, so that they can be drawn nearer and farther apart from it in parallel lines, and thus the nine repeat-images formed are arranged in position on plate K and can be correctly adjusted. W W are little roller-blinds to shut off the light between the frames when the lenses are drawn apart. These roller-blinds have their rollers in bearings on the outside slides and their unwound ends attached to the center slides, one set of blinds being placed over the other set at right angles to the same. A special drawing is shown of these blinds and some of the adjacent parts in Fig. 13.

In simple cases the lenses are once for all fixed to register correctly and the slides clamped tight, but where different-sized repeats are required it is requisite to have the lenses adjustable. By rotating the object-wheel E or the lens-wheel G the arrangement of the repeat-images can also be varied. To get the exact focus, the object-wheel and its frame can be raised or lowered by any suitable device, such as the four screws P P, passing through frame G and having bearings P' at the top and bottom on the side frames, caused to rotate synchronously by sprocket-wheels q and chain Q, worked by a removable handle Q' on one of the screws P. Similarly the lens-wheel G can be raised and lowered by any mechanical device, such as screws R R and sprocket wheels and chains S. Where drop-patterns are required, a simpler arrangement of lenses is used. (Set forth in Figs. 7, 8, and 9.) T, U, and T' are three slides carrying lenses H. The three slides can be moved independently of each other, or the slides T and T' are fixed and U movable, or vice versa. The movable slide can then be "dropped" or slid endwise until the nine or twelve repeats join up with the required drop, as set forth in Fig. 9. It will be seen in Fig. 9 that the various objectives H form with each other a different arrangement than the same objectives in Fig. 7, the slide U having been removed the distance of the required drop to effect this result.

Figs. 11 and 12 show a form of plate $C^2$ used when it is desired to move the objects about without touching them. In these 11 are two square frames, somewhat similar to the frames of a writing-slate, but thinner, united together by a series of pillars 2. 3 3 3 3 are four glass disks capable of revolving each in its separate plane. On these glass disks the articles forming the pattern are placed, so that if there are four articles, emblems, or devices placed one on each disk each article, emblem, or device can be moved relatively to the others without moving those others or interfering with them in any way and without placing the hands in the field of view.

A diagrammatic sketch of a different form of the apparatus is set forth in Fig. 10. In this, $A^2$ is the lantern; $B^2$, mirror reflecting downward; $C^2$, object-plate; $B^3$, a second mirror reflecting horizontally; $G^2$, plate carrying lenses; $B^4$, mirror reflecting vertically upward, and $J^2$ translucent plate. From the description of parts A, B, C, G, and J already given the working of these parts with similar letters will be obvious.

The mode of action is as follows: The operator places a few small objects or transparencies on the plate C. The lenses on the wheels G (shown in detail in Figs. 5 and 6) are now adjusted, so as to show nine or more repeats in true focus and position on plate K, which is temporarily inserted in place of plate L, shown in position in the drawings, Fig. 1. In order to get the true focus, the screws R R are simultaneously turned by means of the sprocket-chain S until the lenses come into exact focus. The objects on plate C or the plates 3 in Fig. 11 are moved about until they assume a pattern pleasing to the eye. If it be desired that the repeats should be more distant from each other than shown on the plate K', the lenses are moved farther apart by moving the slides or plates $O'$ $O^2$ nearer to or farther from the center. If it be desired that the angular position of the groups and patterns should be altered alternately to each other, the wheel G is slightly turned on its axis. If a drop be required in the pattern and the lenses be arranged as shown in Fig. 7, the central line of lenses U is "dropped," as it is technically termed, or pulled lengthwise until one row of units register the required drop with the alternate or outward rows of units. When the pattern shows the nine or twelve repeats on the plate J to be a harmonious whole, the plate J is taken off and the plate L substituted in the form therein shown. A plate K', with a field the right size to exactly cover one of the repeats, is now put on position, so as to exhibit the entire area of one repeat. This is now drawn off on the glass or on tracing-paper or is photographed direct onto a sensitive film or plate placed in the position of K', which is developed and preserved. From this plate the pattern can be transferred or recopied onto a weaving-diagram.

I declare that what I claim is—

1. An apparatus for designing patterns, comprising a transparent support for objects from which the pattern is to be produced, a series of adjustable lenses means for supporting them in a plane parallel to the support of the said objects a screen for receiving the images of the said objects and means for throwing rays of light on the objects, so that their forms will be cast by the lenses upon the said image-receiving means for disclosing the result of the arrangement of the said objects, substantially as described.

2. The combination of a lantern, a plate to carry objects which are to form the pattern, a mirror reflecting the rays from the lantern onto said plate, a series of lenses in one plane, a plate at the focus of these lenses to receive the images, and means for adjusting the position of the lenses whereby the various images can be made to exactly register with each other as repeats.

3. An apparatus for producing various designs, comprising an object-support, means for rotating the object-support for varying the position of the said objects in the apparatus, a lens frame or support arranged in a plane parallel with the object-support, means for turning the said lens-support and a screen for collecting the outlines of the objects projecting through the said lenses, together with means for passing rays of light through the object-plate and the lenses, the whole structure being such that the objects may be arranged and rearranged and the lenses varied in their position until a desirable pattern is shown upon the screen, substantially as described.

4. In an apparatus for throwing a series of repeats onto a screen, the combination of a series of lenses, a wheel carrying those lenses, and means for rotating that wheel, substantially as described.

5. An apparatus for throwing a series of repeat reflections upon a screen, comprising an object-support and a lens-support, supporting-screws for holding the object-support adjustably in position, means for rotating all the screws simultaneously, whereby the said object-support can be moved to various planes parallel with the lens-support and a screen for collecting the forms projected by the said objects to determine the style of design they will produce, substantially as described.

6. An apparatus for reflecting a series of images for determining certain designs, comprising a casing, an object-support mounted therein, screws engaging the said support, means for operating the screws simultaneously, a lens-support mounted above the object-support, screws engaging the said lens-support and means for operating them simultaneously, the structure being such that the object-support and the lens-support can be moved to different horizontal planes which are always parallel with each other for properly projecting the images produced by the said objects, substantially as described.

7. An apparatus for throwing a series of repeats on a screen, comprising an inclosing-casing, a removable screen carried at the top thereof for collecting the images which are to produce the design, a lens-support and an object-support both adjustably mounted in the said casing, means for passing rays of light through the said casing, comprising a lamp or lantern and an inclined mirror and means for adjusting the relative position of the objects and the lenses until the desired design is produced upon the screen, substantially as described.

8. In an apparatus for throwing a series of repeat-images onto a screen, the combination of a series of similar lenses, two series of slides crossing each other at right angles on planes parallel with each other, and holding these lenses whereby the lenses can be adjusted in both directions so as not to overlap.

9. In an apparatus for throwing a series of repeat-images onto a screen, the combination with a series of similar lenses, two series of slides crossing each other at right angles and holding these lenses whereby the lenses can be adjusted in both directions so as not to overlap, of a series of blinds arranged above the inner edges of the slides cutting off the light between the lenses when these latter are spread out wide.

10. In an apparatus for throwing a series of repeat-patterns onto a screen, the combination of a series of lenses arranged in parallel movable slides, the center one being capable of being slid backward and forward while the side ones are stationary, whereby the exact amount of drop required in drop-patterns can be made in the repeats and thus a correct repeat of a drop-pattern made.

In witness whereof I have hereunto signed my name, this 3d day of September, 1900, in the presence of two subscribing witnesses.

HARRY MACKINTOSH.

Witnesses:
   CECIL A. S. BAXTER,
   DAVID NOWELL.